(No Model.)
J. M. ROSEBROOKS.
HARVESTING MACHINE.
No. 349,319. Patented Sept. 21, 1886.
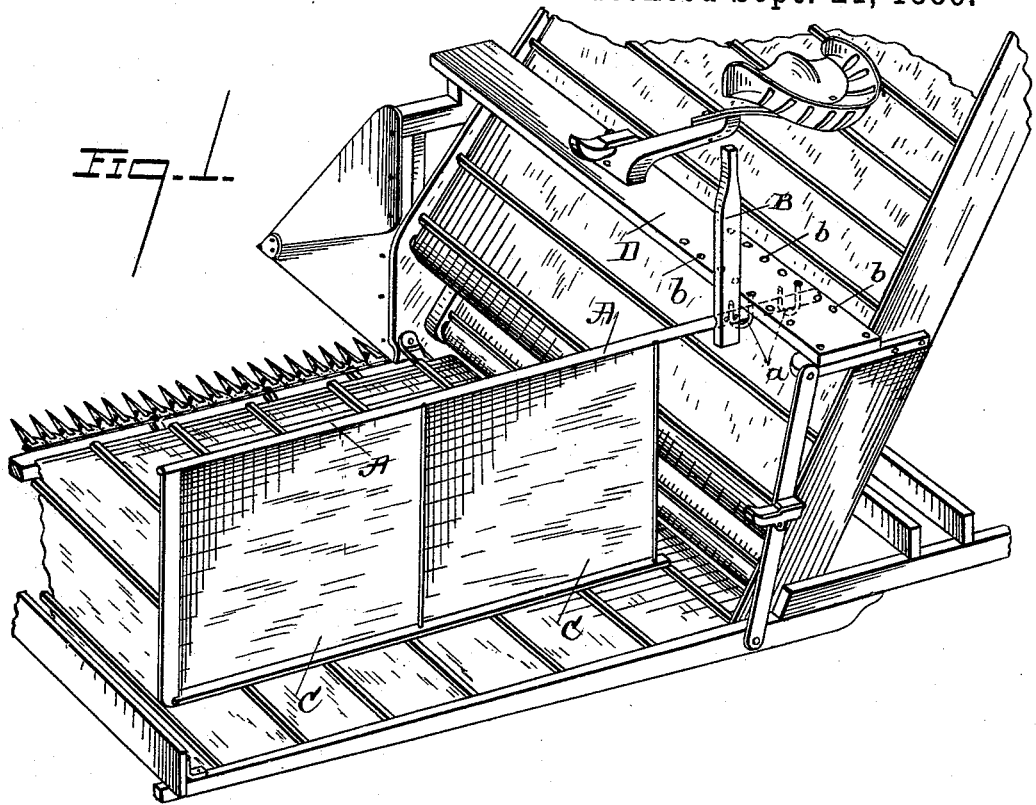
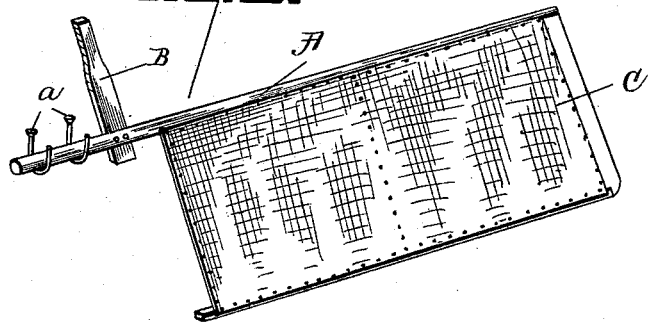
WITNESSES=
W. B. Masson
Hermann L. Matz.
INVENTOR=
John M. Rosebrooks
By J. Russell Parsons
Atty
N. PETERS. Photo-Lithographer, Washington, D. C.

United States Patent Office.

JOHN M. ROSEBROOKS, OF HOOSICK FALLS, NEW YORK, ASSIGNOR TO THE WALTER A. WOOD MOWING AND REAPING MACHINE COMPANY, OF SAME PLACE.

HARVESTING-MACHINE.

SPECIFICATION forming part of Letters Patent No. 349,319, dated September 21, 1886.

Application filed February 18, 1884. Serial No. 121,155. (No model.)

*To all whom it may concern:*

Be it known that I, JOHN M. ROSEBROOKS, of the village of Hoosick Falls, county of Rensselaer and State of New York, have invented certain new and useful Improvements in Harvesting-Machines; and I do declare the following to be a full, clear, and accurate description of the same, reference being had to the accompanying drawings, making a part of this specification.

The invention relates to that class of harvesters on which the grain falls upon a carrier or platform apron and is carried across the platform and then elevated to the binding apparatus; and it consists in certain means for suspending and swinging an adjustable back-board, which serves to prevent the grain from being thrown over the back edge of the platform by the action of the reel, or its being disturbed by the action of the wind, and also serves as a guide to the heads of cut grain. The tendency is for the heads to move faster than the butts of the grain; but when the heads press against the back-board the friction thereon will retard the heads, and the grain will, when the back-board is properly adjusted, move in a uniform stream, with the straws at right angles, or nearly so, to it, and thus be presented to the elevator and elevated and delivered in like good shape to the binder.

I am aware that movable back-boards have been used, some of which can be rocked vertically or tilted, and others are mounted on a pendent frame that can be slid along the supporting-frame.

Figure 1 represents in perspective a portion of a harvesting-machine with the back-board attached. Fig. 2 represents in perspective the back-board detached from the machine.

For the purpose of making this board light and easily moved, I make it of a light framework pendent from a shaft, A, and this framework forms a panel which I cover with cloth. The shaft A is made long enough to extend across the seat-plank D, either over or under it, and is secured thereto by bearings or hooks $a$, in which it can turn, and is made sufficiently tight in the bearings or hooks $a$ to remain at any fixed point where it may be set by the operator. The lever B is bolted rigidly to the shaft A and extends upward toward the driver's seat within reach of the driver. The seat-plank is also provided with a series of holes, which afford a further adjustment of the back-board, if required, in extremely long or short grain. The shaft A having been set in the right place on the seat-plank for the field of grain to be cut, the swinging adjustment may be made by the operator sufficient to cover the variations of the height of the grain in the field.

Having thus fully described my invention, what I claim as new, and desire to secure by Letters Patent, is—

The combination of the carrier or platform frame and the elevator-frame of a harvester and its seat-plank, a series of perforations in said plank, and adjustable suspending-hooks secured therein, with a back-board having one end of its shaft suspended by the hooks from said seat-plank and arranged to tilt over said platform, and a lever secured to said shaft, substantially as and for the purpose described.

In witness whereof I have hereunto affixed my hand.

JOHN M. ROSEBROOKS.

In presence of—
HERMANN L. MATZ,
GEORGE F. CARNEY.